Aug. 3, 1954
C. L. GRILLET ET AL
2,685,164
FRAME FOR TIMING MOVEMENTS AND INSTRUMENTS
AND METHOD OF ASSEMBLING
Filed May 5, 1952
3 Sheets-Sheet 2
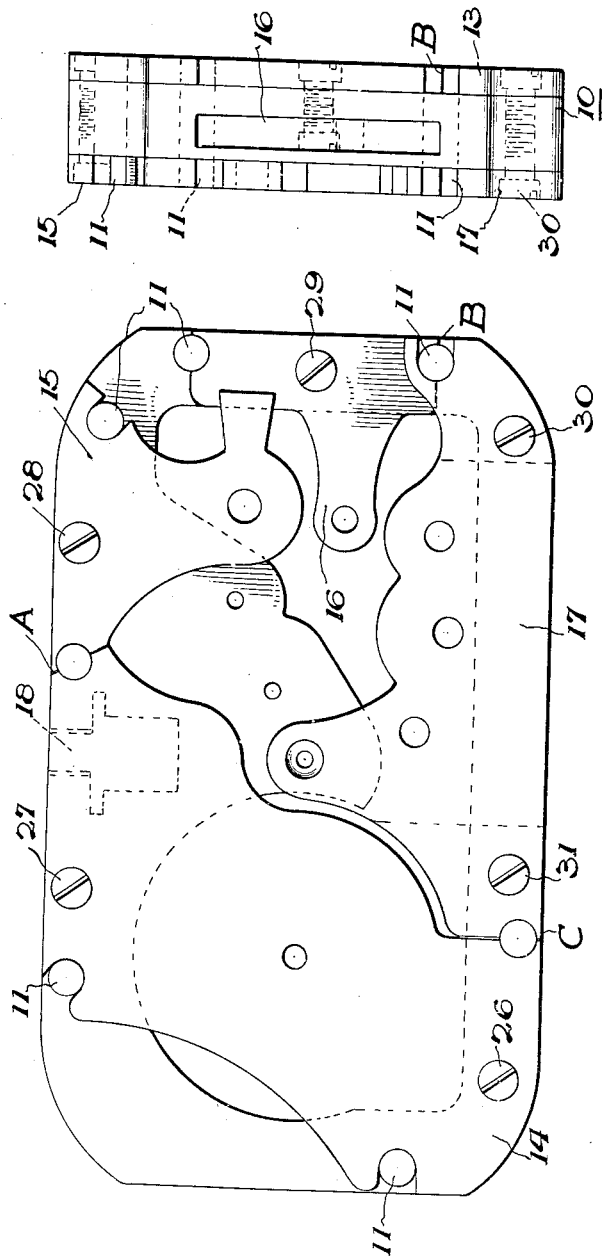
INVENTORS
*Charles L. Grillet*
*Antoine C. Grillet.*
BY 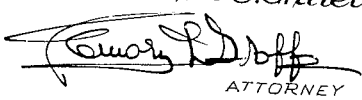
ATTORNEY Aug. 3, 1954

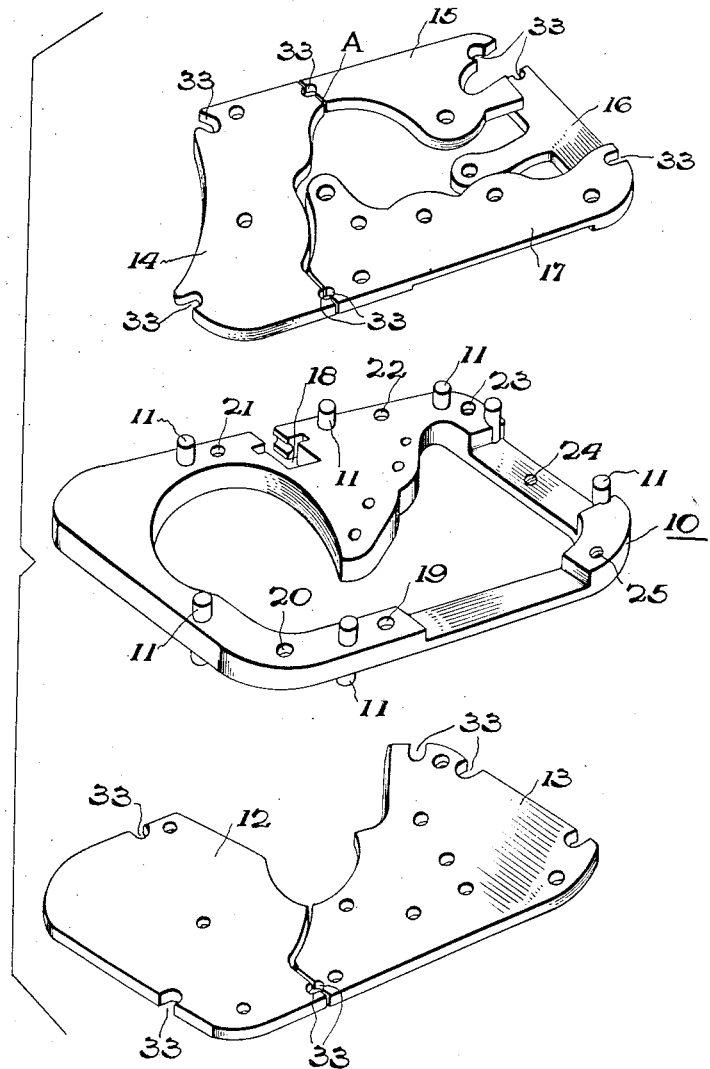

C. L. GRILLET ET AL 2,685,164

FRAME FOR TIMING MOVEMENTS AND INSTRUMENTS
AND METHOD OF ASSEMBLING

Filed May 5, 1952

INVENTORS
Charles L. Grillet
Antoine C. Grillet.

BY

ATTORNEY

Patented Aug. 3, 1954

2,685,164

UNITED STATES PATENT OFFICE 2,685,164

FRAME FOR TIMING MOVEMENTS AND INSTRUMENTS AND METHOD OF ASSEMBLING

Charles L. Grillet and Antoine C. Grillet, Waltham, Mass.

Application May 5, 1952, Serial No. 286,124

8 Claims. (Cl. 58—104)

This invention relates to timing instruments such as watches, clocks, escape mechanisms and other instruments where plates and bridges are the means of holding the works of any mechanism in functioning position.

Heretofore in manufacturing or constructing a watch, for example, a solid plate formed to fit in a particular outer casing was required to be milled and drilled with the utmost precision for the bearing holes and openings for other mechanisms, which mechanisms or works must be aligned and held by their respective bridges in their respective functioning positions. Such precision milling and drilling of the base works plate is costly because expensive machinery and highly skilled tradesmen are essential, and furthermore, equally great precision of manufacture is required for the bridges and the locating steady pins, which pins are a most important factor in aligning the bridges with respect to the drilled and milled base plate.

One object of the present invention is to provide a novel base plate and bridges and works assembly, whereby the base plate and bridges may be formed by methods eliminating milling requirements.

Another object is to provide a novel skeleton base frame or hollow base plate in lieu of a solid milled base plate, said frame having the steady pins formed therewith, or formed separately and inserted (driven) therein.

A further object is to provide novel bridge members formed with notches around their respective peripheral edges for engaging with the steady pins of the base frame, whereby each steady pin may be used to position either one or more adjacent or superposed or both bridges.

A further object is to provide for positioning the base frame or hollow base plate steady pins so as to engage them in notches at the extreme edges of the member bridges, thereby guaranteeing a maximum possible distance between each pin and the bearing centers, and further reducing the influence of tolerances, however small, on the bearing centers.

A further object is to permit each pin to be made sufficiently large to eliminate possible warping. The positioning of the hollow base plate steady pins engaging in notches at the peripheral edges of the member bridges permits choosing larger pins than possible under prior art.

An additional object is to provide for great facility of assembling and disassembling of the member bridges and works without risk of warping the steady pins, and whereby the positioning of the notches at the peripheral edges of the bridges provides for greater ease and speed in the assembling and disassembling than possible in prior art.

Still another object is to provide improvements in novel methods of assembling the movements of time pieces.

With the above and other objects in view, our invention consists of certain novel elements, and the features of construction and arrangement assembly of the parts will be more fully described and particularly pointed out on the appended claims.

In the accompanying drawings:

Figure 1 is a perspective view of the several novel parts of our invention pulled apart, but arranged in alignment in their respective positions when assembled on the base frame or main skeleton plate of a watch movement.

Figure 2 is a top plan view of a watch movement main frame or skeleton plate with steady pins and the novel notched train bridge, barrel bridge, pallet bridge and balance bridge members in assembled position.

Figure 3 is a side view of the assembly in Figure 2.

Figure 4 is an end view of the assembly in Figure 2.

Figure 5:
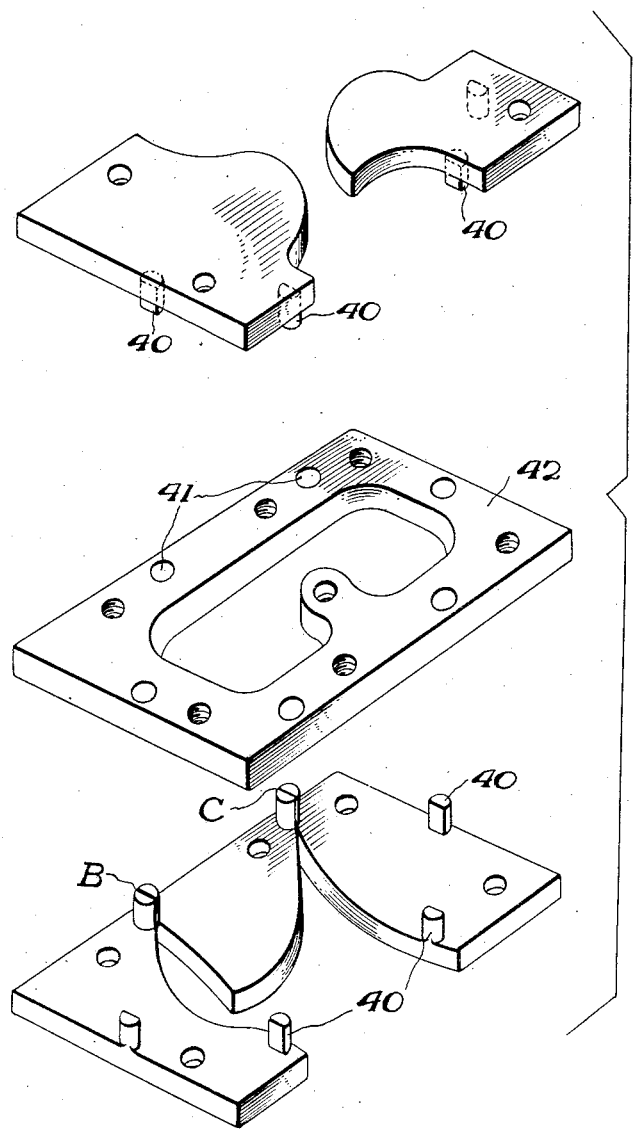
Figure 5 is another embodiment of the invention comprising a perspective view of the several parts of the invention pulled apart, but arranged in alignment in their respective positions when assembled on the base frame.

Referring to the details of the drawings and first with particular reference to Figure 1, our invention comprises broadly a base frame or hollow base plate 10 with a plurality of steady pins 11 arranged to project from the top and bottom of the plate at predetermined positions usually near the peripheral edge thereof, a pair of bridges 12 and 13 for assembly to the bottom of the base frame 10 and a plurality of bridges, namely, the barrel bridge 14, the cock bridge 15 for the balance wheel, the pallet bridge 16 and the train bridge 17, for assembly to the top of the base frame.

An important feature of the invention is the base frame 10, a skeleton or hollow base plate formed by methods eliminating machining, that is, milling and drilling of the space required for the internal parts of the movement. Certain parts of the base frame 10 are made hollow for the usual parts. For example, an opening is formed for the winding mechanism. Generally the base frame is formed with screw holes 19, 21, 22, 23, 24, and 25 to receive corresponding screws 26, 27, 28, 29, 30 and 31, Figure 2, adapted to secure the top bridge members, 14, 15, 16 and 17 formed with aligned screw receiving openings to the base frame after the bridges have been positioned in alignment by the steady pins 11, see Figure 3. Also the screw holes may extend through to the bottom of the base frame and the bottom bridges 12 and 13 secured in position by screws in a similar manner.

One of the most important features of the invention resides in the novel construction of the bridges, which feature comprises a plurality of notches 33 opening from the peripheral edges of each respective bridge. These notches eliminate the usual drilling and other operations for the steady pin holes and greatly facilitates the placing and removal of the bridges. This new positioning of the steady pins 11 in notches 33 at the peripheral edges of the bridge members reduces the possible influence of tolerances, however small, on the bearing centers. With the steady pins engaging at the peripheral edges of the bridges, said pins can be made larger and, therefore, have less possibility of warping than the old type smaller pins.

The several bridge members are formed with notched edges, the usual bearing openings and the like. The notches 33 serve as above stated to keep the steady pins engaged at the edges of the respective bridges. The structure of the base frame, usually termed base plate, is quite different as it is made hollow, that is, in skeleton form to eliminate machining and to provide for a lighter weight structure by utilizing less material. Also each bridge on the top of the hollow frame and each bridge on the bottom of the hollow frame can be made relatively thinner than the hollow frame so that when the movement is assembled the overall weight of the same can be relatively lighter than prior solid plate movements. Once the base frame is made, the method of the works assembly is very simple and precise and one steady pin 11 usually serves to position two or more bridge members, as shown at bridge junctions A, B, C in Figure 3.

Another embodiment of the present invention is illustrated in Figure 5 and differs from the previously described embodiment by providing the bridge members with semi-cylindrical steady pins 40 in lieu of the notches 33. These pins 40 may be shaped together with the bridges and are located at the peripheral edges of the same.

Cooperating with the semi-cylindrical steady pins 40 are holes 41 formed in the hollow frame 42. Thus with this arrangement the flat sides of a pair of adjacent or superposed steady pins may come flush together in the same hole. See B and C.

The method of assembling the bridges on the base frame is very simple. After the base frame or hollow base plate 10 and the various bridge members are ready for assembly, and the bridges and mechanism are placed in position and aligned by the steady pins 11, the bridges are secured into set position by screws in the respective positions on each side of the hollow base plate.

Thus we have provided for greater simplification in the making of parts of movements for timing mechanisms by developing plates and bridges which can be formed by methods eliminating machining and whereby greater accuracy is also assured by the novel positioning of the steady pins in notches at the edges of the bridges, the farthest possible distance between the steady pins and the bearing centers. Also the use of a hollow base plate (frame) with bridges on both sides, and the use of one steady pin to position two or more bridges, are definite advances over prior art of timing mechanism movements.

It is to be understood that a solid base plate may be used in lieu of a hollow base with notched bridges, if desired.

Also, it is understood that the shape, size, location, number and arrangement of the steady pins, bridge members and hollow frame and other parts may differ from the ones shown on the drawings.

While the foregoing specification describes and the drawings illustrate the specific details of the invention, it is to be expressly understood that the same is not limited by these details and is, therefore, susceptible to changes and modifications within the scope of the appended claims without a departure from the spirit of the invention.

We claim:

1. Timing movements and other instruments, comprising a base frame, steady pins projecting above and below the base frame at predetermined locations for engagement into notches of a plurality of bridge members, said notches being located at the peripheral edges of said bridge members.

2. A hollow base plate or frame for the mechanisms of timing movements and other instruments having notched bridge members, said base plate comprising a plurality of steady pins formed to project above and below the base frame into said notches, and a plurality of screw holes formed between the said pins and said notches for securing the notched bridge members of the timing movement upon assembly.

3. A movement assembly for timing mechanisms and other instruments comprising a hollow base plate or frame having a plurality of steady pins projecting from the top and bottom opposite faces thereof, and a plurality of parts holding bridges on top and bottom faces of the hollow frame, each of said bridges having bearing openings, and being notched at their respective edges to engage with the steady pins of the hollow frame.

4. A movement assembly for timing mechanisms and other instruments comprising a hollow base frame having a plurality of steady pins projecting above and below opposite faces thereof, and a plurality of parts holding bridges on at least one face of the hollow frame, each of said bridges having bearing openings, and being notched at their respective peripheral edges to engage with the steady pins of the hollow base plate, said steady pins and the notches being so arranged and proportioned that one steady pin may serve to locate one or more bridges in position.

5. The method of assembling movements for timing and other instruments comprising forming material into a hollow frame with steady pins projecting from the top and bottom faces thereof and a plurality of screw openings between the said pins, forming bridge members with peripheral notches and screw openings between said notches, then selectively engaging the notches of the bridge members against the steady pins of the hollow frame on both sides thereof and then securing the said bridges in their respective set position through the provided screw openings and holding the parts of the mechanism supported by the bridges of the mechanism in position.

6. The method of assembling movements for timing and other instruments comprising forming material into a base plate with steady pins projecting from the upper and lower faces thereof and a plurality of screw openings between the said pins, forming bridge members with peripheral notches and a plurality of screw openings between the said notches, then selectively engaging the notches of the bridge members against the steady pins of the base plate on both sides thereof, and then securing the said bridges in their respective set position through the provided screw openings and holding the parts of the mechanism supported by the base plate in position.

7. A movement assembly for timing mechanisms and other instruments comprising a base plate having a plurality of steady pins projecting from the faces thereof, and a plurality of parts holding bridges on the faces of the base plate, each of said bridges having openings and being notched at their respective outer edges to engage with the steady pins of the base plate, said pins and said notches being so arranged and proportioned that one steady pin may serve to locate and align a plurality of bridges in position, and said base plate and said bridges having screw openings between the said pins and said notches for securing the bridge members upon assembly.

8. Timing movements and other instruments comprising a base plate having a plurality of steady pins projecting from the faces thereof, and a plurality of parts holding bridges on the faces of the base plate, each of the said bridges having openings and being notched at their respective outer edges to engage with the steady pins of the base plate, said pins and said notches being so arranged and proportioned that one steady pin may serve to locate and align two or more bridges in position, and said base plate and said bridges having screw openings between the notches and the steady pins for securing the bridge members upon assembly.

References Cited in the file of this patent

UNITED STATES PATENTS

| Number | Name | Date |
|---|---|---|
| 358,925 | Fitt | Mar. 8, 1887 |
| 580,573 | Dorchester | Apr. 13, 1897 |
| 1,623,907 | Burke | Apr. 5, 1927 |
| 1,874,967 | Greenleaf | Aug. 30, 1932 |
| 2,252,192 | Martin | Aug. 12, 1941 |

FOREIGN PATENTS

| Number | Country | Date |
|---|---|---|
| 30,611 | Switzerland | May 4, 1904 |
| 216,054 | Great Britain | May 22, 1924 |
| 156,808 | Switzerland | Nov. 1, 1932 |
| 892,122 | France | Jan. 3, 1944 |